United States Patent [19]

Ruscak

[11] Patent Number: 4,770,216

[45] Date of Patent: Sep. 13, 1988

[54] ROUTER DADO FIXTURE

[76] Inventor: Gabriel C. Ruscak, 10640 Crestview Dr., North Huntingdon, Pa. 15642

[21] Appl. No.: 86,886

[22] Filed: Aug. 19, 1987

[51] Int. Cl.$^4$ .............................................. B27C 5/00
[52] U.S. Cl. ................................. 144/144 R; 33/197; 33/562; 144/144.5 R; 144/372; 409/130
[58] Field of Search ................ 409/110, 97, 130, 182; 144/144 R, 144.5, 372; 33/197, 562

[56] References Cited

U.S. PATENT DOCUMENTS

| | | | |
|---|---|---|---|
| 2,957,507 | 10/1960 | Vargo | 144/144.5 |
| 3,985,168 | 10/1976 | Lundquist | 144/144 R |

Primary Examiner—W. Donald Bray
Attorney, Agent, or Firm—J. O. Ray, Jr.

[57] ABSTRACT

A fixture which allows cuts to be made in a board with a hand held router in both a longitudinal and transverse direction of such board is disclosed. The fixture includes a pair of first members of predetermined length. A pair of second members of shorter predetermined length secured to the first pair of members such that in an assembled relationship they form a rectangle. At least one T-shaped slot formed in each of the first pair of members and a notch formed in at least one of the second pair of members intermediate the ends thereof.

7 Claims, 1 Drawing Sheet

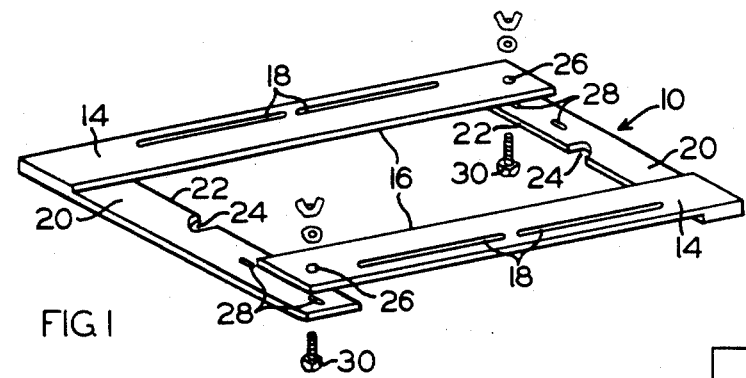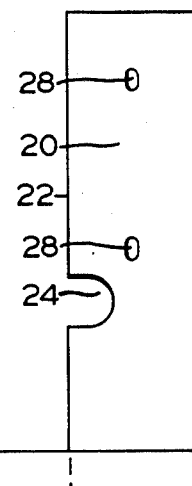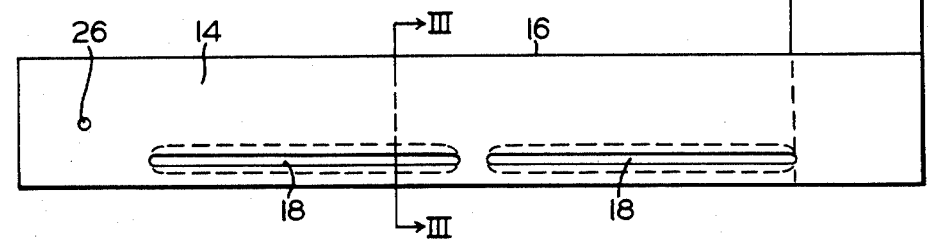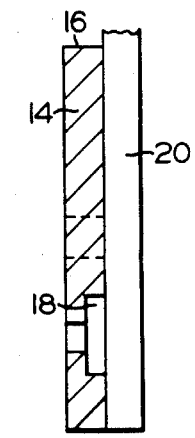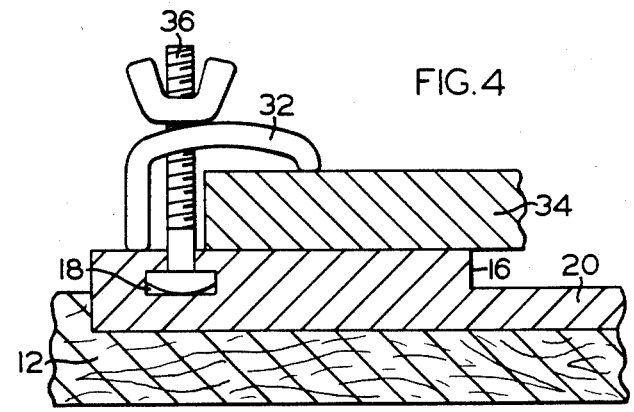

ROUTER DADO FIXTURE

FIELD OF THE INVENTION

The present invention relates, in general, to hand held routers generally used in a home workshop and, more particularly, this invention relates to a dado fixture which can be used to make a substantially straight cut with a router in a board in both a longitudinal direction and a transverse direction of such board.

BACKGROUND OF THE INVENTION

Routers are used extensively by woodworking craftsmen for making many articles of furniture. In manufacturing such furniture a relatively large number of substantially straight cuts may be required. Such cuts may be required in a direction across the width of a board as well as along the length of the board. One such case, for example, would be in the manufacture of a bookcase. In this case cuts are made across the width of some boards to accomodate shelving while cuts may be desirable along the length of some boards to accomodate the back panel of the bookcase.

Prior to the present invention guides for making a substantially straight cut with a hand held router across the narrow portion of a board have been used. Such guides being commercially available to wood workers. However, such commercially available dado fixtures, to the best of applicant's knowledge, cannot be used successfully to make a cut along the lengthwise direction of such board. For this reason when such a cut along the longitudinal direction of a board is required a different arrangement must be used to make the cut. One such arrangement may be a special jig. In some shops dado blades may be used in a table or a radial arm saw. Obviously this adds to the cost of equipment required by the woodworking craftsman. Furthermore, this operation can also add to the amount of time required to finish the job. An additional disadvantage to presently used fixtures is encountered if the particular board being used should be warped or bowed.

SUMMARY OF THE INVENTION

The present invention is a fixture for use with a hand held router. This fixture enables such router to make substantially straight cuts to a uniform depth in a board in both a longitudinal direction and a transverse direction of such board. The fixture comprises a first pair of elongated first members having a first predetermined length. Each of the first members has at least one straight edge which straight edge faces each other during use. This fixture also has a second pair of elongated second members having a second predetermined length. The predetermined length of the second members is shorter than the predetermined length of the first members. Each of the second members having at least one straight edge which straight edge faces each other during use. A means is provided to secure the first pair of first members to the second pair of second members such that in an assembled relationship a rectangle is formed. In each of the first pair of elongated first members at least one T-shaped slot is formed and a notch is provided in at least one of the second pair of elongated second members. The notch is provided intermediate the ends of the second member and adjacent the at least one straight edge.

OBJECTS OF THE INVENTION

It is, therefore, one of the primary objects of the present invention to provide a dado fixture having the capability of guiding a hand held router in a substantially straight line in both a longitudinal direction and a transverse direction of a board.

Another object of the present invention is to provide a dado fixture which is relatively light weight and generally easy to use.

Still another object of the present invention is to provide a dado fixture which eliminates the need for special jigs or table or radial arm saw set ups to make substantially straight cuts along the longitudinal direction of a board.

Yet another object of the present invention is to provide a dado fixture which will save time in making substantially straight cuts along the length of a board.

A further object of the present invention is to provide a dado fixture which will provide a generally uniform depth of cut even in a bowed or warped board.

It is an additional object of the present invention to provide a dado fixture which can be manufactured at a relatively low cost.

The above described objects and advantages of the dado fixture of the present invention in addition to various other objects and advantages will become more readily apparent to those persons skilled in the woodworking tool art from the following more detailed description of the invention when such description is taken in conjunction with the attached drawing figures and with the appended claims.

BRIEF DESCRIPTION OF THE DRAWINGS

FIG. 1 is a perspective view of a presently preferred embodiment of a dado fixture of the present invention;

FIG. 2 is a plan view of one side and one end of the dado fixture illustrated in FIG. 1;

FIG. 3 is a cross-sectional view taken along lines III—III of FIG. 2; and

FIG. 4 is a fragmented cross-sectional view showing the dado fixture positioned for use on a board.

BRIEF DESCRIPTION OF THE INVENTION

Prior to proceeding to the detailed description of the present invention it should be noted that identical components have been identified with identical reference numerals throughout the several drawing figures.

Now refer more particularly to FIG. 1 which illustrates a presently preferred embodiment of a dado fixture, generally designated 10, for use with a hand held router (not shown). This fixture permits use of the hand held router to make substantially straight cuts in both a direction along the length of a board 12 (FIG. 4) and in a transverse direction of such board 12.

The dado fixture 10 includes a first pair of elongated first members 14 which have a first predetermined length. Each of the first members 14 have at least one straight edge 16 which faces each other during use. There is provided at least one and preferably two T-shaped elongated slots 18 in each of the first pair of first members 14.

The fixture 10 also includes a second pair of elongated second members 20 which have a second predetermined length that is shorter than the first predetermined length. Each of the second members 20 have at least one straight edge 22. The straight edge 22 of each of the second members 20 face each other when the fixture 10 is assembled for use. At least one and preferably both of the second members 20 include a notch 24 formed therein intermediate each end and adjacent the straight edge 22. In order to make the fixture 10 lightweight and at a relatively low cost it is preferred that each of the first members 14 and the second members 20 be manufactured from plastic.

In the presently preferred embodiment one end of a first member 14 is formed integral with one end of a second member 20 forming an L-shaped section. Adjacent a second end of each first member 14 there is an aperture 26 and adjacent a second end of each second member 20 there is at least one and preferably two elongated slots 28. A means, preferably a bolt 30, is provided to secure the second end of a respective first member 14 to a second end of a respective second member 20 through the apertures 26 and slots 28 provided therein. The elongated slots 28 providing the necessary tolerances for different size boards.

Finally when using the fixture 10 to make longitudinal cuts the fixture 10 includes a clamp means (FIG. 4) to clamp the router base 34 to the fixture 10. The clamp means includes a C-shaped member 32 engageable with one surface of the first member 14 and the router base 34. A bolt 36 is engageable with the slot 18 and with the C-shaped member 32 to hold the router in the desired position during use.

To use the fixture 10, of the present invention, place the two L-shaped members together, insert the bolts 30 up through the elongated slots 28 and the apertures 26. To adjust fixture 10 to the router base bring the edges 16 together for a smooth snug fit and then tighten the bolts 30. Once in a position no further adjustment is required. To dado: i.e., cut in a transverse direction with respect to the length of the board set the fixture 10 in place by aligning the fixture to the center line of a cut to be made. Clamp the fixture 10 in place such as by using C-clamps. Adjust the router to the desired depth of cut. Place the router in the fixture 10, start and make cut.

To make longitudinal cuts move the two L-shaped sections together to the inner elongated slots 28, bolt tight with the bolts 30, clamp the router to the top of the fixture 10 with the C-shaped clamp and the bolt 36. Locate the router in the position desired, clamp in place, set the depth of cut, start and slide fixture 10 along the edge of the board.

While a presently preferred embodiment of the invention has been described in detail above it should be obvious to persons skilled in the woodworking tool art that other modifications and adaptations can be made without departing from the spirit and scope of the appended claims.

I claim:

1. A fixture for use with a hand held router which enables such router to make substantially straight cuts in both a longitudinal and a transverse direction of a board, said fixture comprising:
    (a) a first pair of elongated first members having a first predetermined length, each of said first members having at least one straight edge, said straight edge facing each other during use;
    (b) a second pair of elongated second members having a second predetermined length shorter than said first predetermined length, each of said second members having at least one straight edge, said straight edge of said each of said second members facing each other during use;
    (c) means for securing said first pair of first members to said second pair of second members such that in an assembled relationship a rectangle is formed;
    (d) at least one T-shaped slot formed in said each of said first pair of elongated first members; and
    (e) a notch formed in at least one of said second members intermediate each end thereof and adjacent said at least one straight edge.

2. A fixture, according to claim 1, wherein each of said second pair of second members includes a notch intermediate each end thereof and adjacent said at least one straight edge.

3. A fixture, according to claim 1, wherein said means to secure said first pair of first members to said second pair of second members includes a bolt.

4. A fixture, according to claim 3, wherein one end of each of said first pair of first members is formed integral with one end of one of said second pair of second members.

5. A fixture, according to claim 1, wherein said fixture further includes a clamp means for clamping a router to said fixture in a predetermined position.

6. A fixture, according to claim 5, wherein said clamp means includes:
    (a) a generally C-shaped member having an aperture therethrough; and
    (b) a bolt engageable with said T-shaped slot and said C-shaped member.

7. A fixture, according to claim 1, wherein said fixture is plastic.

* * * * *